United States Patent Office 2,779,694
Patented Jan. 29, 1957

2,779,694

DISAGGREGATION OF STARCH A AND B FRACTIONS

Eugene Pacsu, Princeton, N. J., and Albert W. Bauer, Baltimore, Md., assignors to Textile Research Institute, Princeton Township, N. J., a corporation of New Jersey No Drawing. Application March 19, 1952, Serial No. 277,552

9 Claims. (Cl. 127—71)

This invention relates to methods for separating constituents of starch whereby the effectiveness of such separation is more nearly complete than has been possible heretofore and the purity of the products obtained is increased.

It is generally recognized that starch is composed essentially of two constituents which are frequently referred to as the "A-fraction" and the "B-fraction." Most starches contain about 15 to 35% of A-fraction, depending on their source, the remainder of the starch being the B-fraction.

The A-fraction is composed primarily of amylose which is a linear polymer believed to have a helical configuration. It is relatively insoluble in water and offers possibilities as a basic material for the production of synthetic fibers by acetylation. The B-fraction is composed primarily of amylopectin, which is a branched type of polymer. It is much more readily soluble in water and is useful in sizing fabrics, the production of pastes and puddings, and for many other purposes.

The manner in which the A and B-fractions are combined in the starch molecule or granule has not been definitely established. They may be joined by hydrogen bonds, by coordinate linkages or by mechanical entanglement, or by a combination of these or other forms of attachment. The present invention may therefore be said to result in disaggregation of the A and B-fractions without attempting to explain the nature of the physical or chemical reactions which take place in effecting separation of the starch constituents.

Several methods have been suggested heretofore for separating the constituents of starch, but they have in general been so expensive and incomplete in operation as to be of little commercial value. Thus, for example, aqueous solutions containing from 1 to 3% of starch have been heated for a period of from 4 to 10 hours at 100° C., or they have been heated for 2 to 4 hours at higher temperatures in an autoclave. "Thin boiling starches" prepared in a conventional manner by acid treatment below the gelatinization temperature have been used in somewhat higher concentrations in the autoclaving process. From starch solutions treated in any of these ways the A-fraction is precipitated by the action of alcohols and is separated by filtration or centrifuging. The yield of A-fraction obtained by such methods is generally only about 70% of theory and the iodine number, which may be taken as an indication of purity, is usually only 10 to 12 as determined by the method of Wilson, Schoch and Hudson (J. A. C. S., vol 65, page 1381; 1943).

In accordance with the present invention, very satisfactory yields of A and B-fractions are obtained and the purity of the fractions is improved. In particular, the B-fraction may be obtained with an iodine number of zero indicating complete separation of the A-fraction therefrom and even the A-fraction usually has an iodine number of 16 or higher. Moreover, the concentration of the starch solutions treated can be increased considerably and the temperature to which the solution is heated is below 100° C. so that no autoclaves are required and inexpensive equipment may be used. Furthermore, the duration of the heat treatment may be relatively short—generally less than 1 hour, whereby the cost of conducting the operation is materially reduced.

These results are attained by mixing starch with an acidic aqueous solution followed by heating of the mixture to a temperature above its gelatinization temperature. Precipitation of the A-fraction by means of known polar compounds or otherwise can then be effected on cooling. The B-fraction remaining in solution can be precipitated in a substantially pure form by further addition of alcohols to the mother liquor or by other suitable methods.

One of the objects of the present invention is to provide improved methods for effecting the disaggregation of starch.

Another object of the invention is to reduce the cost and time required for separating the A and B-fractions of starch.

A further object of the invention is to produce B-fractions of starch which are of high purity.

A specific object of the invention is to provide methods whereby acidic aqueous starch solutions of relatively high concentration may be fractionated quickly and easily and at temperatures below 100° C.

These and other objects and features of the present invention will appear from the following description thereof in which reference is made to typical and preferred methods of procedure for the purpose of indicating the nature of the invention but without intending to limit the scope of the invention thereto.

The type of starch used in the practice of the present invention does not appear to alter the effectiveness of the process and therefore starch derived from corn, wheat, potatoes or other grain or vegetable sources may be used in the form of unmodified or native starch granules or in the form of modified starches such as "thin boiling" starches.

The concentration of the starch in the solution may be as high as 20% or more based on the weight of the water used and, in fact, the upper limit in starch concentration appears only to be determined by the ability of the equipment employed in effecting intimate contact of the starch with the acidic aqueous solution during gelatinization of the starch, and the manner in which one fraction is separated from the other. Dilute solutions containing only 1 or 2% of starch are equally useful in the practice of the present invention.

The aqueous mixtures may be acidified with any acid or agent capable of producing a solution having a pH value below 5 and preferably about 1. Thus, solutions of strong mineral acids in concentrations of from about 0.05 to 0.5 Normal are most suitable although other acids may be used. Typical of such acids are hydrochloric, sulfuric, phosphoric, citric, tartaric, acetic and chloracetic acids.

Solutions or slurries of starch in such aqueous media when heated are found first to thicken or gelatinize but as heating is continued and the temperature raised the solution again becomes relatively thin and the starch dissolves. The gelatinization temperatures varies with the composition of the solution. Thus, in pure water starch will gelatinize at 72°, whereas in 0.1 Normal solution of hydrochloric acid the gelatinization temperature is about 82° C. When 15% of butanol is added to the 0.1 Normal HCl solution the gelatinization temperature of the starch is reduced to about 62° to 63° C.

It is further found that when starch is heated to temperatures above the gelatinization temperature in the presence of a strong acid, there is a tendency for an insoluble precipitate to be formed, which may be retrograded amylose. However, the formation of this precipitate is suppressed or prevented by the presence of an A-fraction precipitating agent in the solution during heating. It is therefore preferable in most instances to add butanol or other organic polar agent for forming an insoluble A-fraction complex or precipitate to the acidic starch mixture before it is heated.

The duration of the heating operation is preferably rather short—that is less than 1 hour. In fact, the duration of heating influences the purity and yield of the fractions obtained. Thus, in a typical case, the most complete separation of the two fractions is obtained by heating the butanol-acid-starch mixture about 35 minutes when the pH value is approximately 1 and the temperature of heating is about 85° C.

The mixture is preferably stirred continuously during the process and as it thickens may become quite stiff in consistency particularly when the amount of starch used is 15 or 20% by weight of the mixture. Little or no rise in temperature takes place during gelatinization but thereafter the temperature rises on continued heating aind the mixture becomes fluid again. Since acid degradation of starch tends to occur at elevated temperatures, it is preferable to maintain the solution at about 80° to 90° C. and below about 100° C. for the duration of the heat treatment.

Thereafter on cooling the mixture to room temperature or lower, the A-fraction is precipitated as an insoluble material and may be separated by filtration, centrifuging or otherwise. The remaining solution containing the B-fraction may then be treated in any way to separate the B-fraction. Thus, methanol or other water soluble alcohols may be added to precipitate the B-fraction.

In order to illustrate typical procedure in accordance with the present invention, the following examples are cited:

*Example I*

12.44 grams of dry defatted corn starch were mixed into 100 ml. of 0.1-N hydrochloric acid and 15 ml. of butanol. The vessel was heated in a boiling water bath while the slurry was stirred. After 1½ minutes, the temperature reached 62.5° C., the gelatinization temperature of the mixture. The temperature did not rise above 64° C. while the slurry gelatinized to a lard-like consistency. Throughout this period, stirring was continued while the viscosity of the slurry gradually decreased. Six minutes after the heating was begun, the temperature reached 85° C. where it was held constant for an additional 35 minutes. Only intermittent stirring was necessary. At the end of this period, the mixture was removed from the boiling water bath and allowed to cool to room temperature. After the mixture had stood for one day at room temperature, the A-fraction was centrifuged from the slurry at 2000 R. P. M. The B-fraction was precipitated with 200 ml. of methanol. Both fractions were washed twice with methanol, then twice with diethyl ether, and then dried in a vacuum oven at 90° C. and 6 mm. of mercury, pressure.

The yield of A-fraction obtained was 25.3% and it had an iodine number of 16.7%. The yield of B-fraction was 74.7% and had an iodine number of 0.0—that is zero.

*Example II*

A 19.2% solution of starch in 0.1-N hydrochloric acid containing 15% butanol was heated to 85° C. for 45 minutes. After cooling and centrifuging the A-fraction recovered gave a yield of 35.1% and had an iodine number of 7.6, which because it is so low was believed to contain substantial occluded B-fraction. However, 64.9% of B-fraction was obtained from the remaining solution by treatment with methanol and this product had an iodine number of 0.0—that is zero—showing a good yield of high purity B-fraction.

*Example III*

10.5 grams of defatted corn starch were mixed with 100 ml. of 0.10-N hydrochloric acid to which 15 ml. of butanol were added. The mixture was heated for 7 minutes at a temperature of 85° C. and then cooled to room temperature. On centrifuging 33% of A-fraction was recovered having an iodine number of 11.1%, whereas 67% of B-fraction was recovered by the addition of methanol to the B-fraction. The iodine number of the B-fraction was 0.54%.

*Example IV*

10.5 grams of a thin boiling starch (Huron Milling Company No. 450 Starch, Lot No. 586–1) having a Scott viscosity of 49/100 were dissolved in 100 ml. of 0.10-N hydrochloric acid to which 15 ml. of butanol were added. The solution was heated for 6 minutes at a temperature of 85° C. and thereafter cooled to room temperature and centrifuged to recover the precipitated A-fraction. The yield was 21% having an iodine number of 12.7, whereas the B-fraction recovered from the mother liquor was 78.9% and had an iodine number of 0.1%.

While butanol was used as the agent for precipitating the A-fraction and methanol used for precipitating the B-fraction in each of the foregoing examples, it will be apparent that any of the known or suitable agents which form insoluble complexes with the A-fraction or cause precipitation of the A- or B-fractions in any manner, can be substituted for the butanol. Among such precipitants may be mentioned the organic polar compounds and particularly the water soluble alcohols methanol, ethanol, propanol, butanol and pentasol, as well as cyclohexanol, borneol and others. In precipitating the B-fraction acetone, ether alcohol solutions and other precipitants may be used.

Similarly, the duration of heating may be varied although best results are attained by heating at least 8 or 10 minutes at temperatures above the gelatinization temperature of the starch in the solution or slurry. While heating may be carried to 100° or even higher and continued for over one hour, degradation, acid hydrolysis and rupture of the bonds within the starch fractions is increased by more drastic treatment with resulting decrease in the yield and purity of the amylose and amylopectin recovered.

The mother liquor or B-fraction containing solution remaining after separation of the A-fraction and removal of the precipitant may contain from 8 to 15% of B-fraction or amylopectin in solution and therefore may be used directly as an agent for sizing yarns, fibers or fabrics. If citric acid is used in the process, the resulting mother liquor may be used in producing pudding mixtures or for other purposes. In any event, the solution may be concentrated by vacuum distillation or otherwise or may be spray dried to produce an article of commerce without precipitating the B-fraction from solution.

When the B-fraction containing solution is evaporated under reduced pressure, the butanol comes off as an azeotropic distillate during the initial stage of evaporation and may be recovered for reuse in treating additional starch solutions. The mother liquor may also be neutralized and other agents may be added thereto to condition or prepare the B-fraction containing solution or the spray dried product for application in other processes or for forming particular products containing amylopectin.

The type of equipment used in carrying out the process on a commercial scale should, of course, be chosen for the most economical operation and may include heating by either direct or indirect use of steam or otherwise. It will therefore be evident that the present invention is capable of wide variations within the limits indicated and accordingly, the examples cited should be understood to be intended for illustrative purposes only since they are not intended to limit the scope of the invention.

We claim:

1. The method of separating constituents of starch which comprises mixing the starch with an aqueous solution having a pH value below 5 and containing an organic polar agent which will form an insoluble complex with the A-fraction of the starch, heating the mixture to a temperature above the gelatinization temperature of the starch but below 100° C. for a period of at least 7 minutes, thereafter cooling the solution and separating the disaggregated A-fraction of the starch therefrom.

2. The method of separating constituents of starch which comprises the steps of heating the starch in an aqueous solution containing a water soluble alcohol and having a pH value below about 5, to a temperature above the gelatinization temperature of the starch but below 100° C. for a period of at least 7 minutes, thereafter cooling the solution and separating the disaggregated A-fraction therefrom.

3. The method of separating constituents of starch which comprises the steps of mixing the starch with an aqueous solution having a pH value of about 1 and containing an acid and an organic polar agent which will form an insoluble complex with the A-fraction of the starch, heating said mixture to a temperature above the gelatinization temperature of the starch but below 100° C. for a period of at least 7 minutes, and thereafter cooling the solution and separating the disaggregated A-fraction therefrom.

4. The method of separating constituents of starch which comprises the steps of mixing the starch with an aqueous solution having a pH value of about 1 and containing an acid and a water soluble alcohol, heating said mixture to a temperature above the gelatinization temperature of the starch but below 100° C. for a period of at least 7 minutes, and thereafter cooling the solution and separating the disaggregated A-fraction therefrom.

5. The method of separating constituents of starch which comprises the steps of mixing up to 20% of starch with a 0.05 to 0.5 Normal solution of a strong mineral acid containing a water soluble alcohol, and heating said mixture to a temperature above the gelatinization temperature of the starch and below 100° C. for a period of at least 7 minutes and not exceeding 1 hour, cooling the solution and separating the disaggregated A-fraction therefrom.

6. The method of separating the A-fraction of starch from the B-fraction thereof which comprises the steps of heating the starch in an acidic aqueous solution having a pH value of about 1, to a temperature above the gelatinization temperature of the starch but below 100° C. for a period of at least 7 minutes, cooling the solution, precipitating the A-fraction from said solution with a water soluble alcohol, and thereafter separating the B-fraction from the resulting mother liquor.

7. The method of separating the A-fraction of starch from the B-fraction thereof which comprises the steps of heating the starch in an acidic aqueous solution having a pH value of about 1 and containing up to about 15% of a water soluble alcohol, to a temperature above the gelatinization temperature of the starch but below 100° C. for a period of at least 7 minutes, cooling the solution to room temperature, separating the resulting precipitated A-fraction therefrom, and thereafter separating the B-fraction from the resulting mother liquor.

8. The method of obtaining the B-fraction of starch which comprises the steps of mixing the starch with an acidic aqueous solution having a pH value of about 1 and containing an organic polar agent which will form an insoluble complex with the A-fraction of the starch, heating the mixture to a temperature above the gelatinization temperature of the starch but below 100° C. for a period of at least 7 minutes, cooling the solution, precipitating the A-fraction from said solution, separating the A-fraction therefrom, and thereafter precipitating the B-fraction from the resulting mother liquor.

9. The method of obtaining the B-fraction of starch which comprises the steps of mixing up to about 20% of starch with a 0.05 to 0.5 Normal solution of a mineral acid containing up to 15% of butanol, heating the solution to from about 80° to 90° C. for a period of from about 6 to 60 minutes, cooling the solution to about room temperature, separating the precipitated A-fraction therefrom, adding a water soluble alcohol to the resulting mother liquor and separating the precipitated B-fraction therefrom.

References Cited in the file of this patent

UNITED STATES PATENTS

| 2,319,637 | Schopmeyer | May 18, 1943 |
| 2,515,095 | Schoch | July 11, 1950 |
| 2,515,096 | Schoch | July 11, 1950 |

OTHER REFERENCES

Radley: "Starch and Its Derivatives," New York, 1944, page 49.

Kerr: Chem. & Ind. of Starch, 2nd Ed., N. Y., 1950, pages 190, 191, 192 and 217.

"Chemistry and Industry of Starch" by Ralph W. Kerr, 2nd Ed., Academic Press, N. Y. (1950), (page 143).

"Journal of the American Chemical Society," volume 65, February 1943; "The Isolation of an Amylose in Crystalline Form" by R. W. Kerr et al. (page 193).